(12) United States Patent
Le Ridant et al.

(10) Patent No.: US 11,920,098 B2
(45) Date of Patent: Mar. 5, 2024

(54) METHOD FOR TREATING A FEED GAS STREAM AND ASSOCIATED INSTALLATION

(71) Applicant: TECHNIP FRANCE, Courbevoie (FR)

(72) Inventors: Guillaume Le Ridant, Maisons Lafitte (FR); Benoit Laflotte, Rueil Malmaison (FR)

(73) Assignee: TECHNIP FRANCE, Courbevoie (FR)

( * ) Notice: Subject to any disclaimer, the term of this patent is extended or adjusted under 35 U.S.C. 154(b) by 488 days.

(21) Appl. No.: 17/294,383

(22) PCT Filed: Nov. 15, 2019

(86) PCT No.: PCT/EP2019/081531
§ 371 (c)(1),
(2) Date: May 14, 2021

(87) PCT Pub. No.: WO2020/099658
PCT Pub. Date: May 22, 2020

(65) Prior Publication Data
US 2022/0010225 A1    Jan. 13, 2022

(30) Foreign Application Priority Data
Nov. 16, 2018    (FR) ........................... 1860626

(51) Int. Cl.
*C10L 3/10*        (2006.01)
*B01D 3/14*        (2006.01)
*F25J 3/02*        (2006.01)

(52) U.S. Cl.
CPC ............... *C10L 3/10* (2013.01); *B01D 3/14* (2013.01); *F25J 3/0209* (2013.01); *F25J 3/0233* (2013.01);
(Continued)

(58) Field of Classification Search
CPC .... C10L 3/10; C10L 2290/06; C10L 2290/10; C10L 2290/46; C10L 2290/48;
(Continued)

(56) References Cited

U.S. PATENT DOCUMENTS 4,695,303 A * 9/1987 Montgomery, IV ... F25J 3/0233
                                                       62/622
4,883,514 A * 11/1989 Mehra ....................... C10L 3/10
                                                       62/938

(Continued)

FOREIGN PATENT DOCUMENTS

WO    WO-8700518 A1 *  1/1987
WO    2012/052681 A2   4/2012
WO    2014/006178 A1   1/2014

OTHER PUBLICATIONS

International Search Report and Written Opinion Issued in corresponding PCT application No. PCT/EP2019/081531, dated Feb. 24, 2020.

(Continued)

*Primary Examiner* — Matthew J Merkling
(74) *Attorney, Agent, or Firm* — Locke Lord LLP; Christopher J. Capelli

(57) ABSTRACT

The method includes cooling and liquefying a feed gas stream, separating a stream obtained from the feed gas stream, and recovering a treated gas stream and a natural gas liquid stream. The method further includes compressing the treated gas stream in order to form a compressed treated gas stream, and fractionating the natural gas liquid stream into a plurality of hydrocarbon fractions (28, 30, 32, 33). The method additionally includes withdrawing from the compressed treated gas stream, of a recycle stream, and reintroducing the recycle stream without cooling into the feed gas stream, into the cooled feed gas stream, or into a stream obtained from the cooled feed gas stream upstream of an expander.

19 Claims, 3 Drawing Sheets

(52) U.S. Cl.
CPC ......... *F25J 3/0295* (2013.01); *C10L 2290/06* (2013.01); *C10L 2290/10* (2013.01); *C10L 2290/46* (2013.01); *C10L 2290/48* (2013.01); *C10L 2290/543* (2013.01); *C10L 2290/58* (2013.01); *F25J 2200/02* (2013.01); *F25J 2205/04* (2013.01); *F25J 2210/04* (2013.01); *F25J 2230/32* (2013.01); *F25J 2230/60* (2013.01); *F25J 2240/02* (2013.01); *F25J 2280/02* (2013.01)

(58) Field of Classification Search
CPC ............. C10L 2290/543; C10L 2290/58; F25J 2200/02; F25J 2205/04; F25J 2230/32; F25J 2230/60; F25J 2240/02; F25J 2280/02
See application file for complete search history.

(56) References Cited

U.S. PATENT DOCUMENTS

| | | | | |
|---|---|---|---|---|
| 5,673,571 A * | 10/1997 | Manley | ................. | F25J 3/0209 62/631 |
| 6,354,105 B1 * | 3/2002 | Lee | ................. | F25J 3/0209 62/619 |
| 7,051,552 B2 * | 5/2006 | Mak | ................. | F25J 3/0238 62/621 |
| 7,219,513 B1 * | 5/2007 | Mostafa | ................. | F25J 3/0209 62/620 |
| 11,268,757 B2 * | 3/2022 | McCool | ................. | F25J 3/0209 |
| 2006/0260356 A1 * | 11/2006 | Schroeder | ................. | F25J 3/0615 62/620 |
| 2007/0012072 A1 * | 1/2007 | Qualls | ................. | F25J 3/0233 62/620 |
| 2012/0047943 A1 * | 3/2012 | Barclay | ................. | F25J 1/0289 62/611 |
| 2013/0213087 A1 * | 8/2013 | Currence | ................. | F25J 3/0233 62/621 |
| 2014/0238075 A1 * | 8/2014 | Paradowski | ................. | F25J 3/0233 62/620 |
| 2017/0336137 A1 * | 11/2017 | Mak | ................. | F25J 3/0238 |
| 2020/0340741 A1 * | 10/2020 | Calderon | ................. | F25J 3/0295 |
| 2020/0386474 A1 * | 12/2020 | Chan | ................. | F25J 1/0022 |

OTHER PUBLICATIONS

French Search Report dated Jul. 30, 2019 issued in corresponding French Application, FR 1860626.

* cited by examiner

METHOD FOR TREATING A FEED GAS STREAM AND ASSOCIATED INSTALLATION

CROSS REFERENCE TO RELATED APPLICATIONS

This application is a U.S. National Phase Application filed under 35 U.S.C. § 371, based on International PCT Patent Application No. PCT/EP2019/081531, filed Nov. 15, 2019, which application claims priority to French Patent Application No. 1860626 filed on Nov. 16, 2018. The contents of these applications are incorporated herein by reference in their entirety.

FIELD OF THE INVENTION

The present invention relates to treatment method for treating a stream of natural gas including the following steps:
  supplying a feed gas stream and conveying the feed gas stream into a gas liquid extraction unit for extracting natural gas liquids;
  within the gas liquid extraction unit, cooling and advantageously at least partial liquefying the feed gas stream, expanding, in an expansion member, and separating, in a separation column, at least one stream obtained from the cooled feed gas stream, and recovering after separation, a treated gas stream and a natural gas liquid stream;
  compressing the treated gas stream in at least one compressor of a gas compression unit in order to form a compressed treated gas stream; and
  fractionating, in a fractionation unit, of the natural gas liquid stream into a plurality of hydrocarbon cuts.

Such a method is designed to enable the extraction of natural gas liquids in a feed gas stream, followed thereafter by the selective fractionation within the natural gas liquids, of light liquid components, for example ethane and propane, over the heavier liquid components, in particular butane, pentane or heavier hydrocarbons.

This method is designed to enable units that are dimensioned accordingly for extraction of a feed gas lean in natural gas liquids, to simply treat feed gas compositions that are richer in natural gas liquids, while reducing to a minimum both the eventual oversizing of the recovery and fractionation units for recovering and fractionating the natural gas liquids, as well as the associated energy consumption.

BACKGROUND OF THE INVENTION

In general, the gas liquid recovery units for recovering natural gas liquids are designed and dimensioned so as to produce a determined quantity of these liquids, in particular the light liquid components contained in natural gas liquids, notably ethane and propane.

The determined quantity is defined in order to meet the needs of the installation, for example in terms of necessary refrigerants required for a liquefaction train, or is defined by the feed for a complex producing olefins downstream.

During the conception and design, the variability in the composition of the natural gas feed is taken into account to a certain extent. Generally, the unit is designed and dimensioned on the basis of the leanest gas that it would be possible to treat therein, taking into account a high rate of extraction of natural gas liquids.

This is not entirely satisfactory, in particular with regard to accepting feed gas compositions which are richer in natural gas liquids. Indeed, in case of these richer feed gas compositions, a very significant extraction of heavy compounds of natural gas liquids is undergone, in order to achieve the rate of extraction required for the lighter compounds. The extraction of these heavy natural gas liquid compounds is not necessarily desirable. This involves two unsatisfactory consequences.

On the one hand, the high rate of extraction of natural gas liquids for a rich input composition must be taken into account when dimensioning the equipment units for recovering and fractionating natural gas liquids.

This is not satisfactory, because the size of the fractionation unit like that of the cold box increases significantly, which in turn increases the investment costs and the operating costs, in particular when the starting natural gas is lean in natural gas liquids.

On the other hand, when some of these natural gas liquids are not desired, it is necessary to provide a unit for reinjecting the natural gas liquids, as described in U.S. Pat. No. 9,423,175. The reinjection generates additional investment and operating costs.

An object of the invention is therefore to obtain a treatment method for treating a feed gas, that enables the extraction of natural gas liquids contained in the feed gas at highly variable content levels and which promotes the extraction of light compounds of natural gas over the heavier compounds which may not be desired, while also providing for low investment and operating costs.

SUMMARY OF THE INVENTION

To this end, the invention relates to a gas treatment method of the aforementioned type, characterised by the following steps:
  withdrawing, in the compressed treated gas stream, a recycle stream; and
  reintroducing the recycle stream into the feed gas stream upstream of the extraction unit, into the cooled feed gas stream, or into a stream obtained from the cooled feed gas stream, upstream of the expansion member, without cooling the recycle stream.

The method according to the invention may include one or more of the following characteristic features, taken into consideration in isolation or in accordance with any technically feasible combination:
  adjusting the flow rate of the reintroduced recycle stream as a function of the natural gas liquid content in the feed gas stream;
  the molar flow rate of the reintroduced recycle stream is greater than 10% of the molar flow rate of the feed gas stream prior to the reintroduction of the recycle stream, the molar flow rate of the reintroduced recycle stream being advantageously comprised between 30% and 400% of the molar flow rate of the feed gas stream prior to the reintroduction of the recycle stream;
  the content of C2+ hydrocarbons in the feed gas stream after reintroduction of the recycle stream is at least 20% lower than the content of C2+ hydrocarbons in the feed gas stream prior to the reintroduction of the recycle stream;
  the molar flow rate of the natural gas liquid stream introduced into the fractionation unit is lower than 20% of the molar flow rate of the feed gas stream, after reintroduction of the recycle stream;
  the recycle stream is introduced without cooling into the feed gas stream upstream of the extraction unit;

the cooling and advantageously at least partial liquefying of the feed gas stream includes introducing the feed gas stream into an upstream heat exchanger, cooling and advantageously at least partially liquefying of the feed gas stream in the upstream heat exchanger, with the recycle stream being advantageously reintroduced into the feed gas stream upstream of the upstream heat exchanger;

the passing of the treated gas stream through the upstream heat exchanger, prior to compression in the compressor;

the cooling of the feed gas stream brings about the at least partial liquefaction of the feed gas stream, the cooled and at least partially liquefied feed gas stream obtained from the feed gas stream, advantageously supplemented by the recycle stream, being introduced into a separation flask in order to produce an overhead gas stream and a bottoms liquid stream, at least one fraction from the overhead gas stream and at least one fraction from the bottoms liquid stream being introduced after expansion in the separation column, the separation column producing at the column overhead the treated gas stream, and at the bottom the natural gas liquid stream;

it includes expanding at least one fraction of the overhead gas stream in the expansion member, the expansion member being a dynamic expansion turbine, in order to form a dynamically expanded fraction, followed thereafter by introducing the dynamically expanded fraction into the separation column;

the fractionation includes the separation of the natural gas liquid stream in at least one distillation column into at least one light cut and one heavy cut, advantageously into one cut rich in C2 hydrocarbons, into one cut rich in C3 hydrocarbons, into one cut rich in C4 hydrocarbons, and into one cut rich in C5+ hydrocarbons;

the recycle stream is reintroduced into the feed gas stream prior to separation of the feed gas stream;

the recycle stream is reintroduced into the feed gas stream upstream of the extraction unit and downstream of a purification and drying step;

the recycle stream is reintroduced in exclusively gaseous form into the feed gas stream;

the expansion member is a dynamic expansion turbine or a static expansion valve;

the residual compressed treated gas stream remaining after withdrawal of the recycle stream is conveyed to a distribution network and/or to a liquefaction train.

The invention also relates to an installation for treating a feed gas, comprising:

an extraction unit for extracting natural gas liquids;

an assembly for supplying a feed gas stream and for conveying the feed gas stream into the gas liquid extraction unit for extracting natural gas liquids;

the extraction unit comprising:

an assembly for cooling and advantageously at least partially liquefying the feed gas stream, that is capable of producing a cooled feed stream;

an expansion member and a separation assembly for separating at least one stream obtained from the cooled feed gas stream, comprising a separation column, the separation assembly being capable of producing a treated gas stream and a natural gas liquid stream;

a compression unit comprising at least one gas compressor for compressing the treated gas stream, able to form a compressed treated gas stream;

a fractionation unit for fractionating the natural gas liquid stream into a plurality of hydrocarbon cuts;

characterised by:

an assembly for withdrawing, from the compressed treated gas stream, of a recycle stream;

an assembly for reintroducing without cooling the recycle stream into the feed gas stream upstream of the extraction unit, into the cooled feed gas stream, or into a stream obtained from the cooled feed gas stream, upstream of the expansion member.

The installation according to the invention may include one or more of the following characteristic features, taken into consideration in isolation or in accordance with any technically feasible combination:

the gas reintroduction assembly is capable of introducing, without cooling, the recycle stream into the feed gas stream upstream of the extraction unit:

the cooling assembly comprises an upstream heat exchanger, in order to cool and advantageously at least partially liquefy the feed gas stream, the gas reintroduction assembly advantageously introducing the recycle stream into the feed gas stream upstream of the upstream heat exchanger; and the cooling assembly is capable of producing a feed gas stream that is at least partially liquefied from the feed gas stream advantageously supplemented by the recycle stream, the separation assembly comprising:

a separation flask receiving the cooled and at least partially liquefied feed gas stream obtained from the feed gas stream supplemented by the recycle stream, in order to produce an overhead gas stream and a bottoms liquid stream;

an assembly for expanding the overhead gas stream and the bottoms liquid stream, that comprises the expansion member;

the separation column connected to the expansion assembly, producing at the column overhead the treated gas stream, and at the bottom the natural gas liquid stream;

it includes conveyance equipment for conveying the residual compressed treated gas stream remaining after withdrawal of the recycle stream, to a distribution network and/or to a liquefaction train.

BRIEF DESCRIPTION OF THE DRAWINGS

The invention will be better understood upon reviewing the description which follows, provided solely by way of example, and made with reference to the appended drawings, in which.

DETAILED DESCRIPTION

Figure 1:
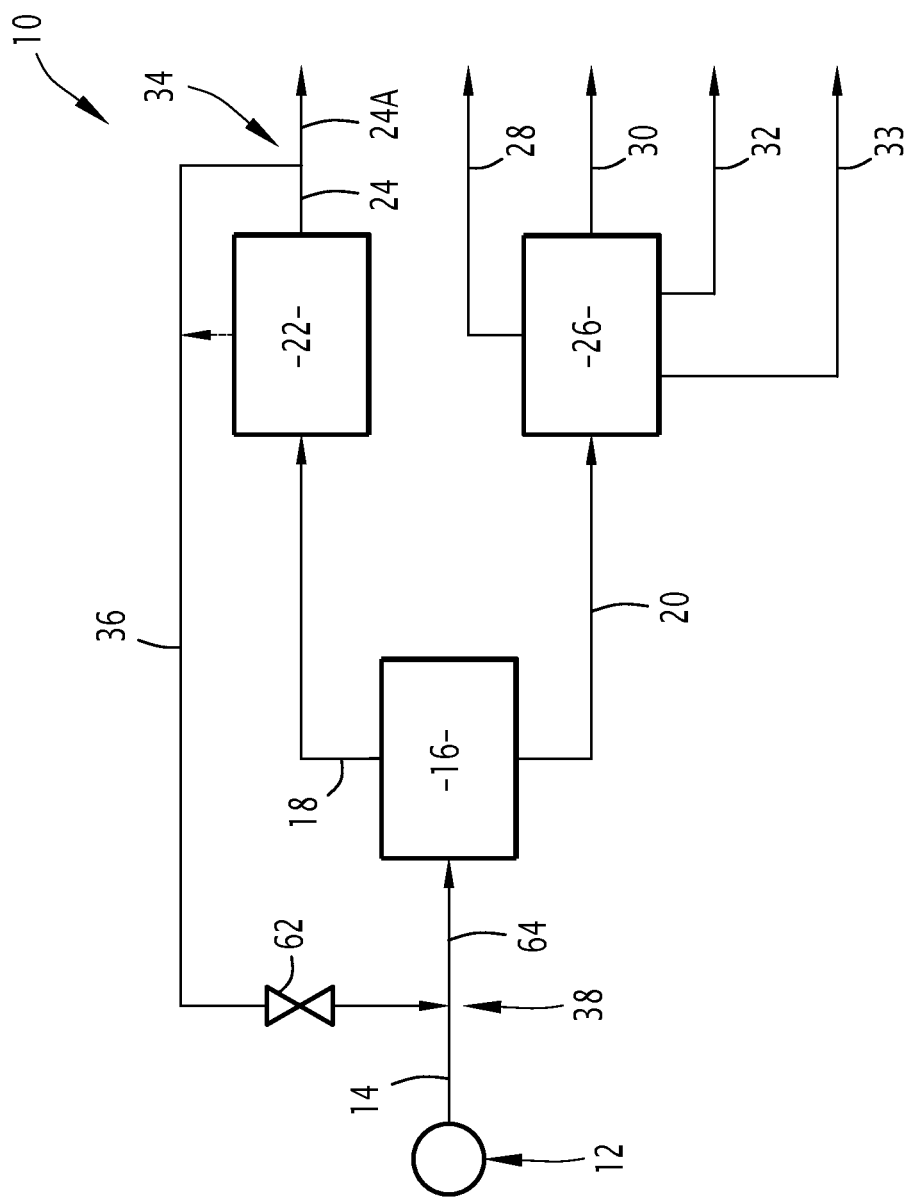
FIG. 1 is a schematic view of an installation designed for the implementation of a first method according to the invention, when used with a feed gas stream rich in natural gas liquids.

In the following, a same given reference numeral denotes a stream flowing in a pipe and the pipe which carries this stream. Furthermore, unless otherwise indicated, the percentages are molar percentages and the pressure values are in relative bars.

A first treatment installation 10 for treating a feed gas, designed for the implementation of a first method according to the invention, is illustrated in FIG. 1.

The installation 10 comprises an assembly 12 for supplying and conveying a feed gas stream 14, and an extraction unit 16 for extracting natural gas liquids, that is capable of producing from the feed gas stream 14, a stream 18 of treated gas, and a stream 20 of natural gas liquids.

The installation 10 additionally also includes compression unit 22, capable of forming a stream 24 of compressed treated gas from the treated gas stream 18, and a fractionation unit 26 capable of forming hydrocarbon cuts 28, 30, 32, 33 from the natural gas liquid stream 20.

According to the invention, the installation 10 in addition comprises a withdrawal assembly 34 for withdrawing, in the compressed treated gas stream 24, a recycle stream 36, and a an assembly 38 for reintroducing the recycle stream 36 into the feed stream 14, upstream of the natural gas liquid extraction unit 16.

The gas supply and conveyance assembly 12 comprises at least one feed gas source 14, and at least one conveyance pipeline for conveying the feed gas 14 to the extraction unit 16.

Figure 3:
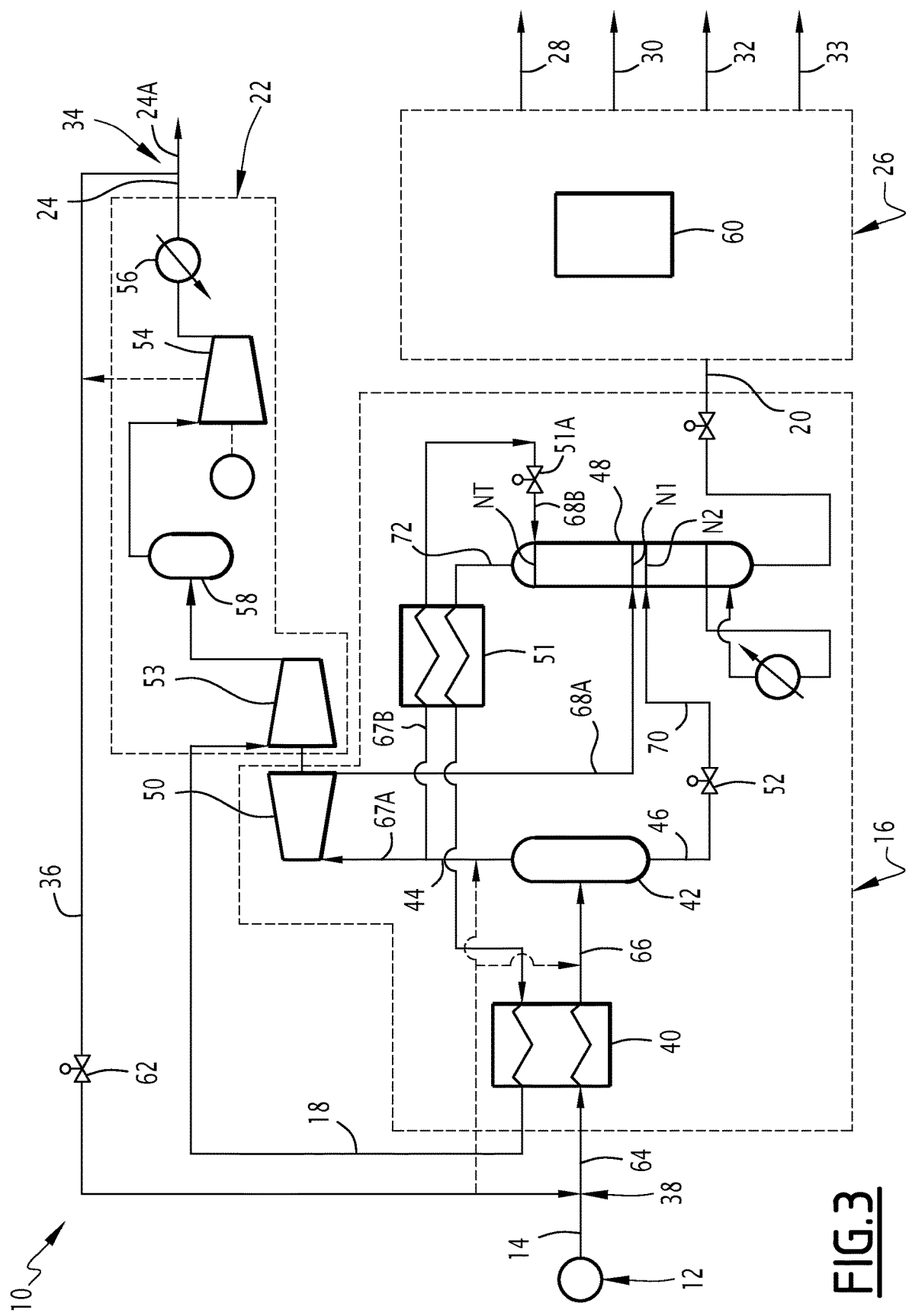
FIG. 3 is an example of a unit for recovering natural gas liquids that can be provided for in the installation of FIG. 1.

A non-limiting example of an extraction unit 16 is a unit of such type as "Gas Subcooled Process" or "GSP", as illustrated in FIG. 3.

In this case, it includes an upstream heat exchanger 40 intended to cool and advantageously at least partially liquefy the feed gas stream 14 that has received the recycle stream 36, a separation flask 42 capable of producing an overhead gas stream 44 and a bottoms liquid stream 46.

The gas liquid extraction unit 16 in addition comprises a separation column 48, provided with a bottoms reboiler and an overhead heat exchanger 51, an expansion member in this instance formed by a dynamic expansion turbine 50 that is capable of expanding at least a portion of the overhead gas stream 44, prior to its introduction into the separation column 48, advantageously a first static expansion valve 51A capable of expanding at least another portion of the overhead gas stream 44, and a static expansion valve 52, for expanding at least a portion of the bottoms liquid stream 46, prior to its introduction into the separation column 48.

The gas compression unit 22 comprises a compressor 53 coupled to the dynamic expansion turbine 50 and at least one compressor 54, advantageously with an associated cooler 56. It advantageously includes, between the compressor 53 and the compressor 54, a liquid separator 58.

The fractionation unit 26 comprises at least one distillation column 60, advantageously provided with a reflux.

The gas withdrawal assembly 34 comprises, for example, a tapping arranged in the pipe that conveys the compressed treated gas stream 24 downstream of the cooler 56, and a pipe for recirculating the recycle stream 36, which is provided with a flow control valve 62.

The gas reintroduction assembly 38 advantageously includes a tapping arranged in the pipe that conveys the feed gas stream 14.

The implementation of a method according to the invention in the installation 10 will now be described.

Initially, a feed gas stream 14 is supplied. The feed gas contains hydrocarbons and is for example formed of natural gas.

It advantageously comprises between 75 mol % and 99 mol % of methane.

When the feed gas is rich in natural gas liquids, it advantageously comprises between 3 mol % and 10 mol % of C2 hydrocarbons, between 1 mol % and 8 mol % of C3 hydrocarbons, and between 0.1 mol % and 8 mol % of C4+ hydrocarbons. On the other hand, when the feed gas is lean in natural gas liquids, the composition of C2+ is significantly reduced, advantageously comprised between 10% and 80% for each of the C2, C3 and C4+ hydrocarbon compounds relative to the molar content of the rich composition indicated above.

The term "Cn hydrocarbons" is used to refer to hydrocarbon compounds consisting of carbon and hydrogen, wherein the number of carbon atoms is equal to n. For example, the term "C2 hydrocarbons" includes ethane, ethylene and acetylene.

The term "Cn+ hydrocarbons" is used to refer to hydrocarbon compounds consisting of carbon and hydrogen, wherein the number of carbon atoms is greater than or equal to n.

The pressure of the feed gas stream 14 is generally greater than 40 bars and is in particular comprised between 50 bars and 75 bars.

The feed gas stream 14 is advantageously purified in order to remove the impurities, in particular sulfur compounds such as mercaptans, and is dried so as to remove the water. The $CO_2$ molar content is lowered in a manner so as to prevent the crystallization of carbon dioxide, this content generally being lower than 1 mol %. The mass content of sulfur compounds is also lowered preferably to less than 10 ppm for hydrogen sulfide and generally to less than 30 ppm for sulfur compounds of types such as mercaptan. Finally, the molar content of water is lowered so as to prevent the formation of hydrate or ice, generally to less than 10 ppm.

The feed gas stream 14 is thus then supplemented by the recirculation stream 36, as will be described here below, in order to form a supplemented feed gas stream 64. The stream 64 is then conveyed to the gas liquid extraction unit 16 for extracting natural gas liquids.

In this unit, it is cooled and advantageously at least partially liquefied, expanded, and separated in order to produce a treated gas stream 18 and a natural gas liquid stream 20.

The natural gas liquid stream 20 is introduced into the fractionation unit 26 in order to be separated into a plurality hydrocarbon cuts 28, 30, 32, 33.

Figure 2:
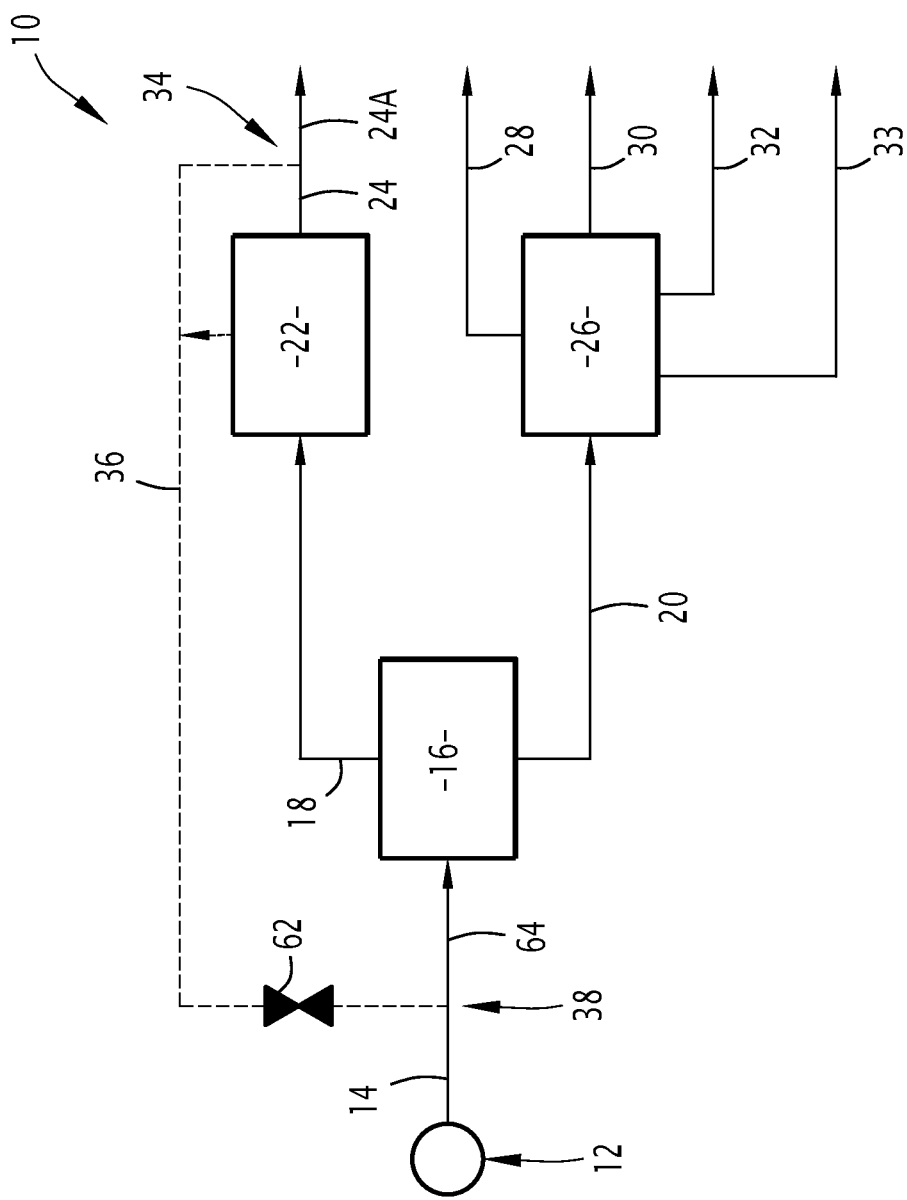
FIG. 2 is a view analogous to that in FIG. 1 of the installation when used with a feed gas stream lean in natural gas liquids.

In the example shown in FIG. 2, in the fractionation unit 26 the cuts produced include at least one cut 28 of C2 hydrocarbons, containing more than 90 mol % of C2 hydrocarbons, one cut 30 of C3 hydrocarbons, containing more than 90 mol % of C3 hydrocarbons, one cut 32 of C4 hydrocarbons containing more than 90 mol % of C4 hydrocarbons and one cut 33 of C5+ hydrocarbons.

The treated gas stream 18 generally comprises less than 30 mol % of the C2+ hydrocarbons contained in the supplemented feed gas stream 64. It has a molar content of C2+ hydrocarbons that is generally lower than 5%.

It generally contains more than 90 mol % of the methane contained in the supplemented feed gas stream 64.

The treated gas stream 18 is then introduced into the compression unit 22 in order to produce a compressed gas stream 24.

The pressure of the compressed gas stream 24 is greater than the pressure of the feed gas stream 14. It is in particular comprised between 50 bars and 100 bars According to the invention, when the feed gas is rich in natural gas liquids, a recycle stream 36 is withdrawn from the compressed gas stream 24 downstream of the gas compression unit 22.

The recycle stream 36 in this instance has a composition that is substantially the same as that of the treated gas stream 18 and the compressed gas stream 24.

The recycle stream 36 thus has a C2+ hydrocarbons content of less than 5 mol %.

The recycle stream 36 is withdrawn without expansion from the compressed gas stream 24.

The recycle stream 36 is then passed through the flow control valve 62 in order to adjust the flow rate thereof. It is then reintroduced into the feed gas stream 14, upstream of the extraction unit 16.

The flow rate of the recycle stream 36 reintroduced into the feed gas stream is adjusted and controlled as a function of the natural gas liquid content in the feed gas stream 14 by means of the control valve 62.

The molar flow rate of the recycle stream 36 is lower than 90% of the molar flow rate of the compressed treated gas stream 24, prior to the recycle stream 36 being withdrawn and is in particular comprised between 25% and 80% of the molar flow rate of the compressed treated gas stream 24, prior to the recycle stream 36 being withdrawn.

Advantageously, the flow rate of the recycle stream 36 reintroduced into the feed gas stream 14 is greater than 10 mol % of the flow rate of the feed gas stream 14 prior to the reintroduction of the recycle stream 36, and is in particular comprised between 30 mol and 400 mol % of the flow rate of the feed gas stream 14 prior to the reintroduction of the recycle stream 36.

The recycle stream 36 is reintroduced into the feed gas stream 14, without cooling between the point of withdrawal thereof from the compressed gas stream 24 and the point of reintroduction thereof into the feed gas stream 14.

The content of C2+ hydrocarbons in the feed gas stream 64 after the reintroduction of the recycle stream 36 is at least 25% lower than the content of C2+ hydrocarbons in the feed gas stream 14 prior to the reintroduction of the recycle stream 36.

The feed gas stream 64 supplemented by the recycle stream 36 is then introduced into the extraction unit 16, as previously described above.

In the particular example shown in FIG. 3, the recycle stream 36 is reintroduced into the feed gas stream 14, upstream from the upstream heat exchanger 40, in order to constitute the supplemented feed gas stream 64.

The supplemented feed gas stream 64 is introduced into the upstream heat exchanger 40 in order to be cooled therein and advantageously at least partially liquefied so as to form a cooled feed gas stream 66.

Advantageously, the temperature of the stream 66 is lower than −10° C. and is in particular comprised between −20° C. and −50° C.

The molar content of liquid in the stream 66 is generally comprised between 0% and 10%.

The stream 66 is subsequently introduced into the separation flask 42 so as to be separated therein into the overhead gas stream 44 and the bottoms liquid stream 46.

A first fraction 67A of the overhead stream 44 is introduced into the dynamic expansion turbine 50 in order to be dynamically expanded therein and in order to form a first fraction of the expanded overhead stream 68A.

The pressure of the first fraction 68A is for example lower than 50 bars and is in particular comprised between 20 bars and 40 bars.

The first expanded fraction 68A is then introduced into the separation column 48, in this instance at a first intermediate level N1.

Advantageously, a second fraction 67B of the overhead stream 44 is successively introduced into the overhead heat exchanger 51 in order to be cooled therein, and thereafter into the static expansion valve 51A in order to be expanded therein and form a second fraction of expanded overhead stream 68B.

The pressure of the second fraction 68B is for example lower than 50 bars and is in particular comprised between 20 bars and 40 bars.

The second expanded fraction 68B is then introduced into the separation column 48, in this instance at an overhead level NT located above the first intermediate level N1.

The bottoms liquid stream 46 is expanded in the static expansion valve 52 in order to form an expanded bottoms stream 70.

The pressure of the expanded bottoms stream 70 is for example lower than 50 bars and is in particular comprised between 20 bars and 40 bars.

The expanded bottoms stream 70 is introduced into the separation column 48 at a second intermediate level N2 situated below the first intermediate level N1 and above the bottoms reboiler.

The separation column 48 produces at the bottom, the natural gas liquid stream 20 intended to feed the fractionation unit 26.

The separation column 48 additionally also produces at the column overhead, a column overhead stream 72. The overhead stream 72 is successively introduced into the overhead heat exchanger 51, and thereafter into the downstream heat exchanger 40 in order to be heated therein and form the treated gas stream 18.

The temperature of the treated gas stream 18 is for example greater than 10° C. at the outlet of the upstream heat exchanger 40.

The treated gas stream 18 is subsequently compressed in the compressor 53. It is then passed through the separator 58 in order to remove any liquids that may possibly be contained therein, and thereafter it is compressed in the compressor 54, before being cooled in the air cooler 56, in order to form the compressed gas stream 24.

In the fractionation unit 26, the expanded bottoms stream 70 is introduced into at least one distillation column 60, preferably into a group of successive columns, so as to produce each of the cuts 28, 30, 32, 33.

As indicated here above, the recycle stream 36 is withdrawn from the compressed gas stream 24, downstream of the compressor 54 and the cooler 56. The residual compressed gas stream 24A is then conveyed to a distribution network or/and to a liquefaction train.

In the example illustrated in FIG. 2, for a feed gas lean in natural gas liquids, the control valve 62 is closed and the flow rate of the recycle stream 36 is zero.

The following tables illustrate examples of implementation of the method according to the invention for a feed gas lean in natural gas liquids, and for a feed gas rich in natural gas liquids. The table illustrates, by way of comparison, a method of the state of the art implemented with a feed gas rich in natural gas liquids.

| Method | Stream | Flow Rate (t/h) | Wherein C2 (t/h) | Wherein C3 (t/h) | Wherein C4 (t/h) | Remarks |
|---|---|---|---|---|---|---|
| According to the invention with lean LNG feed gas (according to FIG. 2) | 14 | 740 | 20.1 (1.5 mol %) | 7.8 (0.4 mol %) | 3.9 (0.16 mol %) | Molar Mass: 16.63 |
| | 20 | 30.9 | Not determined | Not determined | | — |
| | 24 | 709.1 | 3 (0.23 mol %) | 0.2 (0.01 mol %) | 0 | Molar mass: 16.24 |
| | 24A | Idem 24 | Idem 24 | Idem 24 | | Idem 24 |
| | 28 | 17.1 | 99.5 mol % | Not determined | | — |
| | 30 | 7.6 | Not determined | 99.5 mol % | | — |
| | 32 | 3.9 | Not determined | Not determined | 97.5% | — |
| | 33 | 2.3 | Not determined | Not determined | Not determined | Molar mass: 78.2 |
| | 36 | 0 | — | — | | No recycling |
| | 64 | Idem 14 | Idem 14 | Idem 14 | | Idem 14 |
| According to the invention with rich LNG feed gas (according to FIG. 1) | 14 | 200 | 18.5 (5.5 mol %) | 9.9 (2.0 mol %) | 3.9 (0.6 mol %) | Molar mass: 17.85 |
| | 20 | 33.4 | Not determined | Not determined | | — |
| | 24 | 640.7 | Not determined | Not determined | | — |
| | 24A | 166.6 | 1.5 (0.48 mol %) | 0.1 (0.01 mol %) | | Molar mass: 16.16 |
| | 28 | 17.1 | 99.5 mol % | Not determined | | — |
| | 30 | 9.7 | Not determined | 99.5 mol % | | — |
| | 32 | 3.9 | Not determined | Not determined | 97.5 mol % | — |
| | 33 | 2.6 | Not determined | Not determined | Not determined | Molar mass: 79.15 |
| | 36 | 474.1 | Not determined | Not determined | | — |
| | 64 | 674.1 | 22.8 (1.87 mol %) | 10.0 (0.56 mol %) | | Molar mass: 16.62 |
| State of the art with rich LNG feed gas (FIG. 1 without bypass stream 36) | 14 | 740 | 68.5 (5.5 mol %) | 36.6 (2.0 mol %) | | Molar mass: 17.85 |
| | 20 | 76.0 | Not determined | Not determined | | — |
| | 24 | 663 | 4.3 mol % | 0.1 mol % | | Molar mass: 16.72 |
| | 28 | 17.2 | 99.5 mol % | Not determined | | — |
| | 30 | 34.3 | Not determined | 99.5 mol % | | — |
| | 32 | 14.2 | Not determined | Not determined | 97.5 mol % | — |
| | 33 | 9.7 | Not determined | Not determined | Not determined | Molar mass: 79.15 |

As these tables show, the transition from a feed gas lean in natural gas liquids to a feed gas rich in natural gas liquids in the method based on the state of the art leads to a very significant increase in the flow rate of the stream of natural gas liquids 20 extracted via the extraction unit 16, thus requiring particularly significant increase in dimensioning of the fractionation unit 26 in order to accommodate the stream 20, and the possible reinjection of a portion of this stream into the treated gas which would involve natural gas liquid compounds that are not desirable.

On the other hand, the use of a recycle stream 36 formed from the stream of compressed treated gas 24 obtained at the outlet of the compression unit 22 depletes the feed gas stream 14 of C2+ hydrocarbons and limits the molecular weight of the supplemented feed gas stream 64. This produces in the extraction unit 16 a natural gas liquid stream 20 with a significantly reduced flow rate (33.4 t/h for the method according to the invention as opposed to 76 t/h for the method of the state of the art).

Thanks to the recycling, the composition of the supplemented feed gas stream 64 introduced into the extraction unit 16 is maintained so as to be substantially constant, thereby ensuring proper thermal integration, while also limiting the quantity of natural gas liquids and heavy components entering into the unit. The recycling in particular increases the C2/C3+ ratio in the supplemented feed gas stream 64, so as to extract the required quantity of C2 cut, while also minimising the extraction of the C3+ cut (potentially undesirable products), thus enabling the extraction unit 16 to be dimensioned to a minimal size.

The impact of the composition of the richer feed gas on the dimensioning of the equipment is thus limited.

In this manner, a similar production capacity for producing natural gas liquids is obtained with a richer feed gas composition, without generating additional (or minimizing) investment or operating costs.

Thus, it is possible for the method according to the invention to be operated for a wide range of feed gas compositions, without significantly increasing the costs involved.

According to one variant (represented in dotted lines in the figures), the compressor 54 includes a plurality of stages, with the recycle stream 36 being withdrawn from an intermediate stage of the compressor 54 and not downstream of the compressor 54.

According to one variant (represented in dotted lines), the recycle stream 36 is reintroduced into the stream of cooled feed gas 66, within the extraction unit 16, downstream of the heat exchanger 40 and upstream of the separation flask 42.

Alternatively, the recycle stream 36 is reintroduced into a stream obtained from the cooled feed gas stream, downstream of the separation flask 42, and upstream of the separation column 48. The recycle stream is for example reintroduced into the overhead gas stream 44, upstream of the dynamic expansion turbine 50, preferably upstream of the separation between the first fraction 67A of the overhead stream 44 and the second fraction 67B of the overhead stream 44.

In all of the above-mentioned cases, the recycle stream 36 is reintroduced into the cooled feed gas stream 66 or into a stream obtained from the cooled feed gas stream 66 without cooling between the point of withdrawal thereof in the compressed gas stream 24 and the point of reintroduction thereof.

By way of a variant, the dynamic expansion turbine 50 is replaced by a static expansion valve.

The invention claimed is:

1. A feed gas treating method comprising:
   supplying a feed gas stream and conveying the feed gas stream into a natural gas liquids extractor;
   within the extractor;
      cooling the feed gas stream,
      expanding in an expander the cooled feed gas stream,
      separating, in a separation column, at least one stream obtained from the cooled feed gas stream, and
      recovering after separation, a treated gas stream and a natural gas liquid stream;

compressing the treated gas stream in at least one compressor to form a compressed treated gas stream;
fractionating, in a fractionator, the natural gas liquid stream into a plurality of hydrocarbon cuts;
withdrawing a recycle stream in the compressed treated gas stream;
reintroducing without cooling the recycle stream into at least one of:
the feed gas stream upstream of the extraction unit,
the cooled feed gas stream, or
a stream obtained from the cooled feed gas stream, upstream of the expander.

2. The method according to claim 1, comprising adjusting a flow rate of the reintroduced recycle stream as a function of the natural gas liquid content in the feed gas stream.

3. The method according to claim 1, wherein the molar flow rate of the reintroduced recycle stream is greater than 10% of the molar flow rate of the feed gas stream prior to the reintroduction of the recycle stream.

4. The method according to claim 1, wherein a C2+ hydrocarbons content in the feed gas stream after reintroduction of the recycle stream is at least 20% lower than a C2+ hydrocarbons content in the feed gas stream prior to the reintroduction of the recycle stream.

5. The method according to claim 1, wherein a molar flow rate of the natural gas liquid stream introduced into the fractionator is lower than 20% of a molar flow rate of the feed gas stream, after reintroduction of the recycle stream.

6. The method according to claim 1, wherein the recycle stream is introduced without cooling in the feed gas stream upstream of the extraction unit.

7. The method according to claim 1, wherein the cooling of the feed gas stream includes introducing the feed gas stream into an upstream heat exchanger and cooling the feed gas stream in the upstream heat exchanger.

8. The method according to claim 7, comprising passing the treated gas stream through the upstream heat exchanger, prior to compression in the compressor.

9. The method according to claim 1, wherein the cooling of the feed gas stream at least partially liquefies the feed gas stream, the cooled and at least partially liquefied feed gas stream obtained from the feed gas stream being introduced into a separation flask to produce an overhead gas stream and a bottoms liquid stream, at least one fraction from the overhead gas stream and at least one fraction from the bottoms liquids stream being introduced, after expansion, in the separation column, the separation column producing, at a column overhead, the treated gas stream and at a bottom, the natural gas liquid stream.

10. The method according to claim 9, comprising expanding at least one fraction of the overhead gas stream in the expander, the expander being a dynamic expansion turbine, to form a dynamically expanded fraction, and introducing the dynamically expanded fraction into the separation column.

11. The method according to claim 1, wherein the fractionation includes a separation of the natural gas liquid stream in at least one distillation column into at least one light cut and one heavy cut.

12. An installation for treating a feed gas, comprising:
an natural gas liquids extractor;
at least a pipe supplying a feed gas stream and conveying the feed gas stream into the extractor;
the extractor comprising:
a cooler of the feed gas stream, configured to produce a cooled feed stream;
an expander and a separator configured to separate at least one stream obtained from the cooled feed gas stream, the separator comprising a separation column, the separator being configured to produce a treated gas stream and a natural gas liquid stream;
at least one compressor configured to compress the treated gas stream, to form a compressed treated gas stream;
a fractionator configured to fractionate the natural gas liquid stream into a plurality of hydrocarbon cuts;
a recycle stream withdrawer configured to withdraw a recycle stream in the compressed treated gas stream;
a recycle stream introducer configured to reintroduce, without cooling, the recycle stream into at least one of:
the feed gas stream upstream of the extractor, or
the cooled feed gas stream, or
a stream obtained from the cooled feed gas stream, upstream of the expander.

13. The installation according to claim 12, wherein the recycle stream introducer is configured to introduce without cooling, the recycle stream into the feed gas stream upstream of the extraction unit.

14. The installation according to claim 13, in which the cooler comprises an upstream heat exchanger to cool the feed gas stream.

15. The installation according to claim 13, wherein the cooler is configured to produce an at least partially liquefied feed gas stream from the feed gas stream, the separator comprising:
a separation flask receiving the cooled and at least partially liquefied feed gas stream obtained from the feed gas stream supplemented by the recycle stream, to produce an overhead gas stream and a bottoms liquid stream;
the expander being configured to expand the overhead gas stream and the bottoms liquid stream;
the separation column connected to the expander, the separation column being configured to produce at a column overhead, the treated gas stream, and at a bottom, the natural gas liquid stream.

16. The method according to claim 3, wherein the molar flow rate of the reintroduced recycle stream is comprised between 30% and 400% of the molar flow rate of the feed gas stream prior to the reintroduction of the recycle stream.

17. The method according to claim 7, wherein the recycle stream is reintroduced into the feed gas stream upstream of the upstream heat exchanger.

18. The method according to claim 11, wherein the fractionation includes the separation of the natural gas liquid stream into one cut rich in C2 hydrocarbons, into one cut rich in C3 hydrocarbons, into one cut rich in C4 hydrocarbons, and into one cut rich in C5+ hydrocarbons.

19. The installation according to claim 14, wherein the recycle stream introducer is configured to introduce the recycle stream into the feed gas stream upstream of the upstream heat exchanger.

* * * * *